No. 98,017.                    PATENTED NOV. 2, 1869.
A. BONDELI.
PLOWING MACHINE.

Witnesses;
A. W. Almquist
Alex F. Roberts

Inventor;
A. Bondeli
Munn & Co
Attorneys

UNITED STATES PATENT OFFICE.

ALBERT BONDELI, OF PHILADELPHIA, MISSOURI.

IMPROVEMENT IN PLOWING-MACHINES.

Specification forming part of Letters Patent No. 96,017, dated November 2, 1869.

*To all whom it may concern:*

Be it known that I, ALBERT BONDELI, of Philadelphia, in the county of Marion and State of Missouri, have invented a new and useful Improvement in Plowing-Machines; and I do hereby declare that the following is a full, clear, and exact description thereof, which will enable others skilled in the art to make and use the same, reference being had to the accompanying drawings, forming part of this specification, in which—

Figure 3:
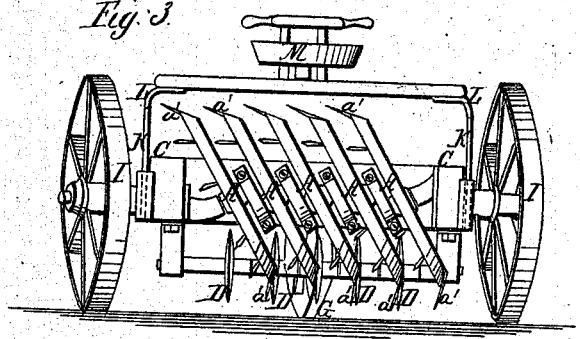
Figure 1:
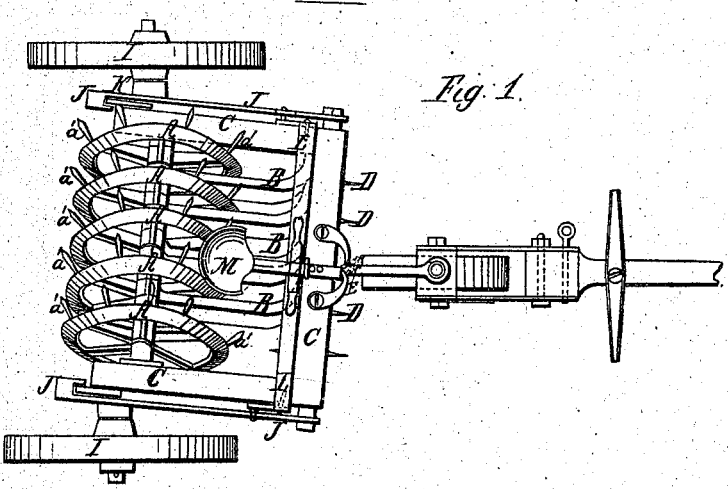
Figure 2:
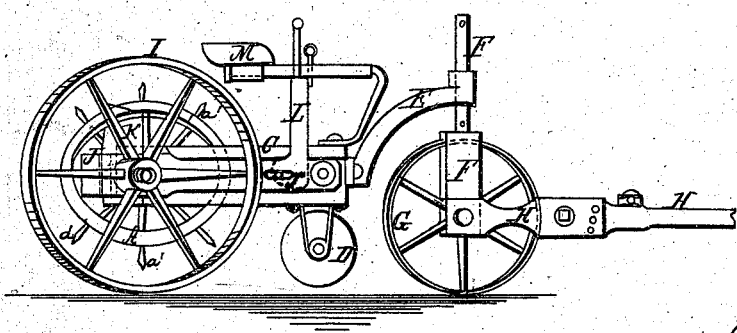

Figure 1, Sheet I, is a top view of my improved machine. Fig. 2, Sheet I, is a side view of the same, taken in the plane of the line *x x*, Fig. 1. Fig. 3, Sheet II, is a rear view of the same, taken in the plane of the line *y y*, Fig. 1.

Similar letters of reference indicate corresponding parts.

My invention has for its object to furnish an improved machine for preparing the ground to receive seed, and which shall be so constructed and arranged as to prepare the ground more thoroughly, and put it in better condition to receive the seed, than when the ordinary plows are used; and it consists in the construction and combination of the various parts of the machine, as hereinafter more fully described.

A are the wheels, one or more, made of cast-iron, about two feet in diameter, and cast solid with their axles. The wheels A are made in the shape of frustums of cones the sides of which form an angle of about one hundred and fifty-seven and a half degrees with their upper or smaller bases. Upon the lower or larger edges of the conical surfaces of the wheels A are formed, or to them are attached, teeth or spades *a'*, which may be of any desired form, according to the character of the soil in which they work, and which should project about six inches, and should be in line with the conical faces of the wheels A, as shown in Figs. 1 and 3. The axles of the wheels A revolve in bearings in suitable supports, B, attached to the main frame C of the machine, and so arranged that the said wheels A may revolve at an angle of about twenty-two and a half degrees with the perpendicular line, as shown in Fig. 3.

In front of each wheel A is placed a circular revolving cutter, D, about sixteen inches in diameter, and supported from the frame C in such a way as to enter the ground about six inches.

The cutters D should be so placed as to take about one-fourth of an inch less land than the spades *a'*—that is to say, in such a way that the spades *a'*, at the point of entering the ground, may reach over the cut made by the said cutters D about one-fourth of an inch.

To the middle part of the front beam of the frame C is attached a socket-arm, E, to receive the spindle of the yoke F, to which the caster-wheel G is pivoted, and which should be so arranged that the said caster-wheel may have a vertical adjustment of about four inches to adjust the depth at which the cutters D work in the ground without throwing the weight upon the horses.

H is the tongue, which should be attached at an angle of about seventy-nine and three-fourths degrees with the front beam of the frame C. The tongue H should be attached to or connected with the machine by means of a hinged joint, so that the machine may be adjusted to run deeper or shallower in the ground without throwing the weight upon the horses, enabling the forward end of the tongue to be held at the same level however the machine may be adjusted.

I are the truck-wheels, the axles of which are securely attached to or formed solidly upon the outer or rear ends of the arms J, the forward ends of which are pivoted to the forward part of the frame C. The rear ends of the arms J and the rear parts of the frame C are connected to each other by guides K, attached to said frame, and grooves formed in the said arms, so that they may move up and down freely upon each other to enable the operating parts of the machine to be raised from the ground and supported upon the wheels I while passing from place to place.

L are bent or elbow levers, which are pivoted at their angles to the frame C, and the short arms of which are pivoted to the arms J, so that the operating parts of the machine may be raised and lowered by operating the said levers L. The upper ends of the levers L are brought into such positions that they may be conveniently reached and operated by the driver from his seat M. The levers L are provided with stop-pins or catches, for holding them securely in position when adjusted. The wheels I should be placed so far back as to give an excess of weight to the forward part part of the machine, to give steadiness of motion during transportation, as when the operating parts of the machine are raised from the ground none of the weight will be borne by the caster-wheel. The forward end of the tongue being maintained at the same height, the line of draft or progression of the machine may be varied several degrees in either direction by raising or lowering the front of the machine, as from the inclination of the axles of the spade-wheels A a' the elevation of the forward end of the machine changes the angle at which the spades enter the ground, and consequently changes the line of progression.

The driver's seat should be over the center of the machine, and should be adjustable, so that it may be moved forward and back to adjust the position of the driver as required. The proportions and angles herein given may be varied considerably without materially affecting the operation of the machine, and owing to the different character of different soils this may sometimes be desirable. Said proportions and angles should therefore be taken as suggested, rather than absolute measurement.

Having thus described my invention, I claim as new and desire to secure by Letters Patent—

1. The spade-wheels A a', one or more, constructed substantially as herein shown and described, and set at an angle with the vertical line and with the line of draft, substantially as and for the purpose set forth.

2. The combination of the circular revolving cutters D with the spade-wheels A a' and frame C, substantially as herein shown and described, and for the purpose set forth.

3. The combination of the adjustable caster-wheel E F G and adjustable hinged or jointed tongue H with the frame C, circular revolving cutters D, and spade-wheels A a', substantially as herein shown and described, and for the purpose set forth.

4. Adjustably connecting the truck-wheels I with the frame C, to which the spade-wheels A a' and the circular revolving cutters D are attached by the pivoted arms J and guide-slides K, or equivalent devices, substantially as herein shown and described, and for the purposes set forth.

5. The combination of the levers L, or equivalent device, with the arms J, to which the axles of the truck-wheels I are attached, and with the frame C, to which the spade-wheels A a' and circular revolving cutters D are attached, substantially as herein shown and described, and for the purposes set forth.

ALBERT BONDELI.

Witnesses:
HANNAH A. KNOX,
JOSEPH KNOX.